Figure 1:
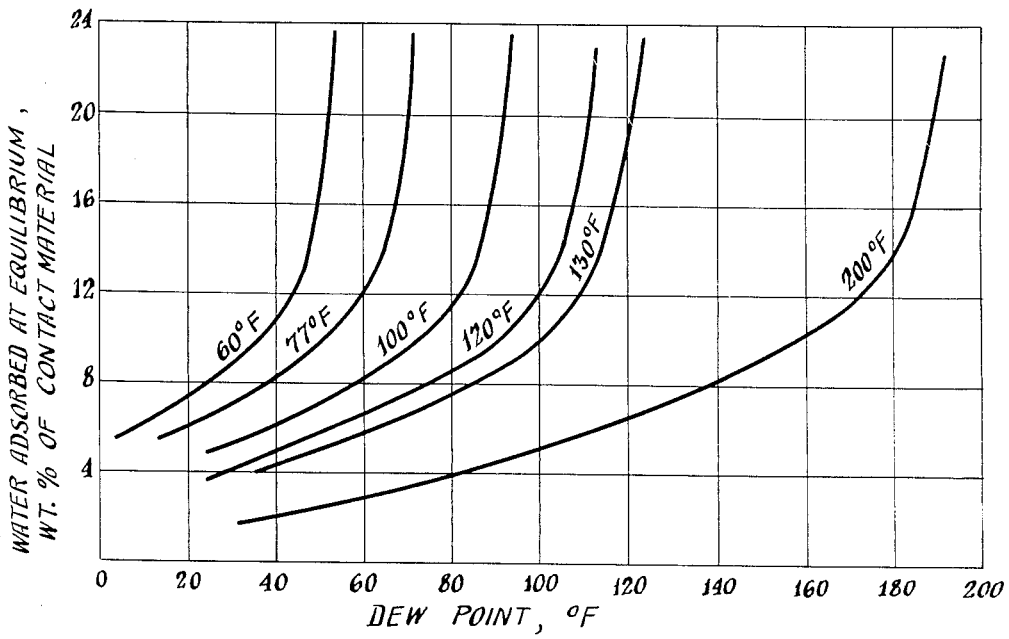
Figure 2:
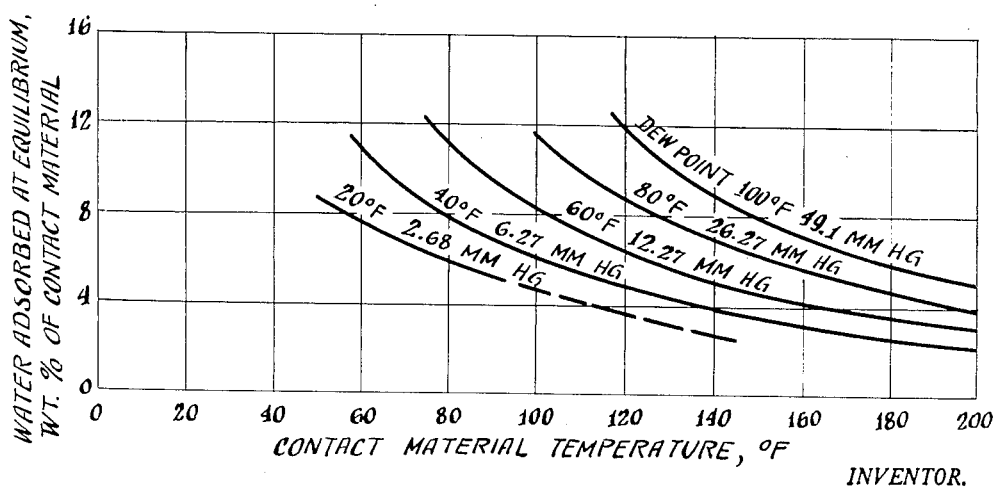

ADSORPTIVE CAPACITIES (WT. % H₂O ADSORBED AT EQUILIBRIUM) VS. DEW POINT AT SEVERAL TEMPERATURES.

WATER VAPOR ISOPIESTICS

July 17, 1956 E. O. GUERNSEY 2,755,230
RECYCLE GAS DEHYDRATION
Filed Nov. 8, 1952 3 Sheets-Sheet 2

INVENTOR.
Edwin O. Guernsey
BY Francis F. Johnston
AGENT

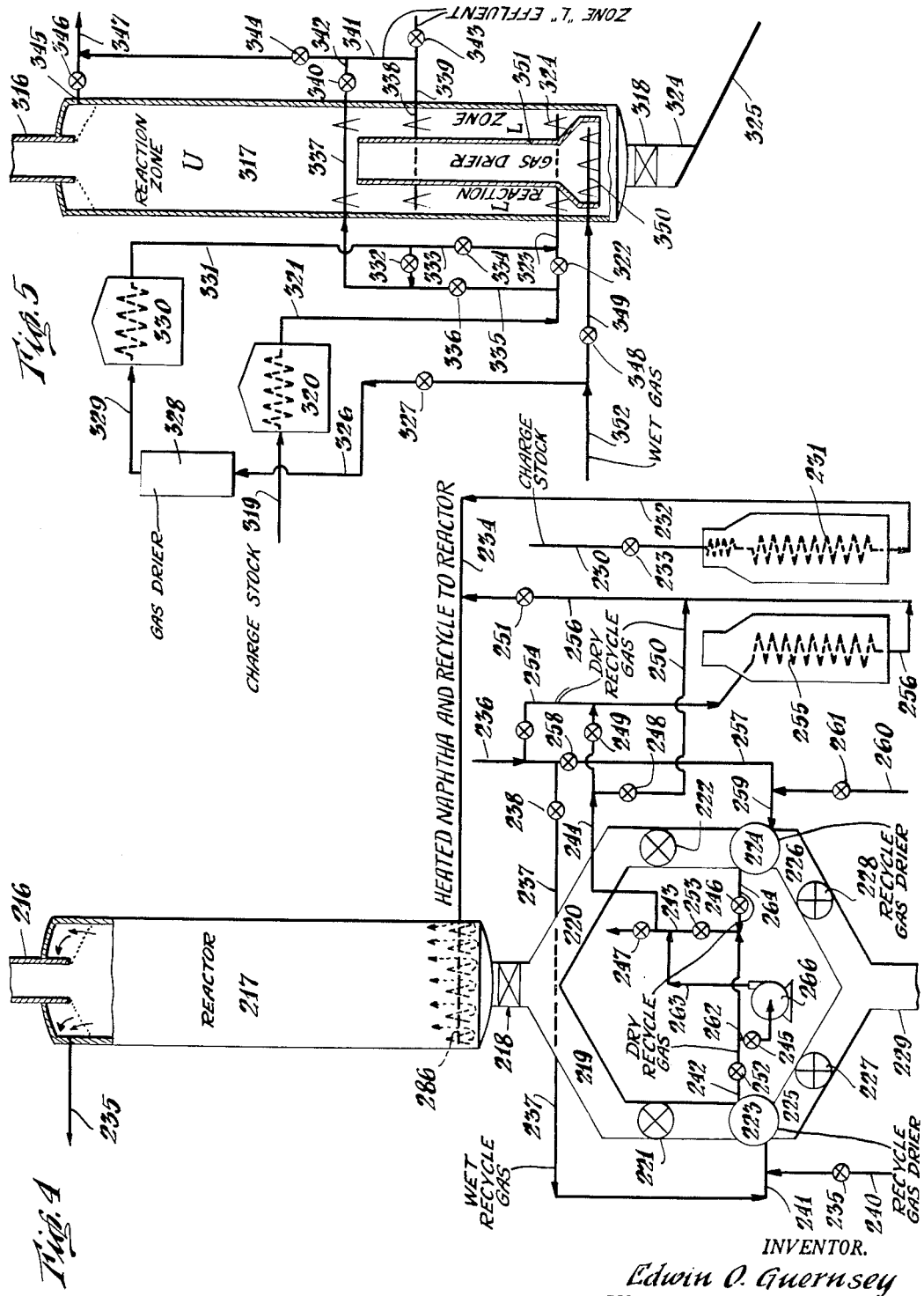

United States Patent Office 2,755,230
Patented July 17, 1956

2,755,230

RECYCLE GAS DEHYDRATION

Edwin O. Guernsey, Woodbury, N. J., assignor to Socony Mobil Oil Company, Inc., a corporation of New York Application November 8, 1952, Serial No. 319,519

5 Claims. (Cl. 196—50)

The present invention relates to catalytic conversions employing particle-form catalysts wherein a gas is recycled through the reactor and, more particularly, to catalytic conversions in which a dry recycle gas, i. e., a recycle gas having a dew point not greater than 40° F. with respect to water is required.

The present invention is concerned with the problem of providing a dehydrated recycle gas when the recycle gas at its source has a moisture content in excess of that which can be tolerated in the reactor. Such a problem arises in catalytic conversion processes such as reforming, aromatization, dehydrogenation, hydrogenation, isomerization and the like.

It has been the practice in the past to purge or pretreat catalysts before or after regeneration in some catalytic conversions with a recycle gas. Thus in U. S. Patent No. 2,388,536, a catalytic conversion employing a static catalyst bed is disclosed wherein contact of the catalyst with recycle gas before or after regeneration is disclosed and the patentee specifically claims contacting the catalyst with hot recycle gas after regeneration.

In contrast to the practice described in U. S. Patent No. 2,388,536, wherein it is manifest that the catalyst cannot be cooled below the temperature of the "hot" recycle gas, in accordance with the principles of the present invention, the catalyst must be cooled to a temperature of at least 200° F. and preferably to a temperature of about 100° to about 150° F. or expressed in other words, the catalyst must be cooled by the recycle gas to a temperature such that the catalyst will absorb and retain, at least until separated from the recycle gas, the quantity of water in the untreated recycle gas which is in excess of that which provides a dehydrated recycle gas having a dew point not greater than about 40° F. and preferably about 10° to about 20° F., or in terms of weight per cent water, the recycle gas contains about .02 to about .07, and preferably about .02 to about .03 weight per cent water or about 3.6 to about 12.6 preferably about 3.6 to about 5.4 grams of water per 1000 cubic feet at standard conditions of treated recycle gas when the recycle gas is used in a reforming reaction in the presence of a chromia-alumina catalyst comprising about 70 mol per cent alumina and the balance chromia. Therefore, in general, the recycled gas is dehydrated to a moisture content, the maximum of which is the maximum which can be tolerated in the reaction in which the recycle gas is to be used and the minimum is that which represents a diminishing return in catalyst available for dehydration, heat balance, and the ratio of available catalyst per unit of recycle gas to be dehydrated.

Those skilled in the art will recognize that the words, "dehydrated" or "dehydrate" or other forms thereof are not used herein in the absolute sense but in the relative sense. Those skilled in the art will also appreciate that the extent of dehydration is dependent upon the amount required. In other words, in one operation a dew point of 40° F. can be the minimum required to provide satisfactory results whereas in another operation a dew point of 60° F. can be satisfactory while in another a dew point of 10° F. can be required. Accordingly, the amount of hot catalyst available, the amount of water which the catalyst can retain at a given catalyst temperature when at equilibrium with a recycle gas of given dew point, the amount of recycle gas and the moisture content thereof are all dependent variables which are fixed once one of them is fixed.

For purposes of illustration, a chromia-alumina reforming catalyst comprising at least 70 mol per cent alumina and the balance, chromia, can be taken as typical. Such a catalyst will retain the amounts of moisture at the catalyst temperatures indicated in Table I.

Table I

| Catalyst Temperature | Weight percent H$_2$O on Catalyst [1] |
|---|---|
| 100° F | 6.2 |
| 120° F | 4.9 |
| 130° F | 4.2 |
| 200° F | 2.0 |

[1] When recycle gas is dried to 40° F. dew point.

It is manifest that 100 pounds of catalyst leaving the dryer at 100° F. will retain as much moisture or will produce a dehydrated gas of the same dew point from a "wet" recycle gas of given moisture content as will 310 pounds of catalyst leaving the dryer at 200° F.

Furthermore, during dehydration, the catalyst will be cooled and the recycled gas will be heated. Thus, for example, in a given operation the catalyst leaves the reactor at a temperature of about 950° F. at the rate of 160 pounds per hour, 8500 cubic feet of recycle gas saturated at 100° F. (2.2 pounds of water) can be dehydrated to provide a recycle gas having a dew point of <10° F. and having a temperature of 288° F. During contact with the recycle gas the catalyst will be cooled from about 950° F. to about 105° F. and leaving the dryer will retain about 1.4 weight per cent moisture.

In the past, refrigeration has been the most satisfactory means for dehydrating recycle gas. However, the limit of dehydration appears to be a recycle gas having a dew point of about 40° F., whereas the method described hereinafter can be employed to obtain dehydrated recycle gas having a dew point as low as 10° F.

In general, the whole of the catalyst stream from the reactor can be used to dehydrate the recycle gas. On the other hand, when the volume of dehydrated recycle gas required in the reaction is such that the total catalyst stream would not be cooled to a temperature at which a recycle stream of the required dew point is in equilibrium only a portion of the catalyst stream is used for dehydration.

While the whole catalyst stream when used to dehydrate the recycle gas can be transferred directly to the kiln or regenerator, and when only a portion of the total reactor catalyst effluent is used that portion used to dehydrate the recycle gas can be transferred directly to the kiln or regenerator, it is preferred to preheat the cooled catalyst stream or the cooled portion of the catalyst stream before introducing the cooled catalyst into the kiln or regenerator.

Thus, when only a portion of the total reactor catalyst stream is used for dehydrating the recycle gas, the cooled portion can be mixed with the balance which was not used for dehydrating the recycle gas and consequently was not cooled before introduction into the kiln or regenerator. When the total reactor catalyst stream is used to dehydrate the recycle gas, it is preferred to recirculate a portion of the regenerated catalyst to the kiln or regenerator by diverting a portion of the total stream of regenerated catalyst from the outlet of the kiln to the catalyst transfer means whereby the cooled catalyst is transferred from the recycle gas dehydrator to the kiln and thereby mix hot regenerated catalyst with cooled deactivated catalyst from the recycle gas dehydrator. A modification of the latter method of preheating the cooled catalyst involves carrying a constant load of solid-particle heat-transfer medium in the kiln and mixing the heat-transfer medium with the cooled catalyst to preheat the cooled catalyst prior to regeneration. Means for achieving the mixing of hot regenerated catalyst or solid-particle heat-transfer medium with cooled catalyst is provided in the prior art particularly U. S. Patent Nos. 2,506,545 and 2,506,552.

Accordingly, it is an object of the present invention to provide a process in which particle-form catalyst is passed through a reactor at elevated temperatures in excess of 500° F., becomes contaminated thereby with a deactivating deposit which can be removed by combustion in a stream of combustion-supporting gas, is removed from the aforesaid reactor at an elevated temperature of at least 500° F., brought in direct contact with recycle gas whereby the dew point of said recycle gas is lowered from at least 100° F. to a dew point satisfactory in the aforesaid reactor and of the order of 40° F. and lower, the catalyst is cooled to at least a temperature at which, while retaining moisture, it is in equilibrium with recycle gas having the required lowered dew point and the temperature of the recycle gas is raised. It is another object of the present invention to provide a recycle gas having not more than the maximum moisture content satisfactory for a reaction in which said recycle gas is employed in the presence of particle-form catalyst by contacting recycle gas containing moisture in excess of the aforesaid maximum directly with at least a portion of the hot catalyst from said reaction whereby said catalyst absorbs and retains sufficient water from said recycle gas to provide a recycle gas having not more than the aforesaid maximum moisture content and said catalyst is cooled. It is a further object of the present invention to provide a recycle gas having not more than the maximum moisture content satisfactory for a reaction in which said recycle gas is employed in the presence of particle-form catalyst by contacting recycle gas containing moisture in excess of the aforesaid maximum directly with at least a portion of the hot catalyst from said reaction whereby said catalyst absorbs sufficient water from said recycle gas to provide a recycle gas having not more than the aforesaid maximum moisture content, said recycle gas is heated, said catalyst is cooled to a temperature at which it retains the aforesaid absorbed moisture and mixing hot solid particles with said cooled catalyst before introducing said catalyst into a regenerator at elevated temperatures. Other objects and advantages will become apparent to those skilled in the art from the following description of the present invention taken in conjunction with the drawings in which, Figure I is a graph of a family of curves showing the relation between the weight per cent of water absorbed at equilibrium by a chromia-alumina catalyst and the dew point of the dried recycle gas at several catalyst temperatures.

Figure II is a graph of the curves presented in Figure I as a series of isopiestics.

Figure III is a schematic flow sheet of a reforming process illustrative of the application of the principles of the present invention; and Figure IV is a schematic flow sheet of a further application of the principles of the present invention to a reforming process.

It is believed that Figures I and II are self-explanatory. From the data plotted in Figures I and II, the quantity of catalyst necessary to dry a given quantity of recycle gas of given moisture content to a given dew point at a given catalyst temperature can be calculated or, when the quantity of catalyst available is the controlling factor, the volume of recycle gas of given moisture content which can be dried to a required dew point below 40° F. can be determined.

Since the present invention is concerned primarily with the use of the deactivated catalyst shortly after the deactivated catalyst leaves the reactor, it is considered sufficient for those skilled in the art to describe the flow sheet of an entire reforming process only once and to describe the modifications thereof with respect to the use of the catalyst as a drying agent in conjunction with Figures IV and V without detailed reference to the rest of the process.

Figure III is a schematic flow sheet of a reforming process wherein a hydrocarbon reactant comprising at least one hydrocarbon capable of undergoing at least one of the molecular changes isomerization, dehydrogenation and dehydrocyclization is subjected to reforming conditions in the presence of a particle-form solid reforming catalyst in the presence of a gaseous heat carrier which can be a hydrogen-containing gas containing about 25 to about 80 per cent preferably about 35 to about 60 per cent hydrogen and the balance $C_1$ to $C_6$ hydrocarbons or a gas containing less than 25 per cent hydrogen. For clarity and simplicity of description, the course of the catalyst through the reactor and regenerator will be traced first and then the path of the hydrocarbon reactant and reformate will be followed through the reactor and auxiliary equipment.

Active catalyst in reactor feed bin 11 is transferred to the reactor when the reaction is carried out at elevated pressures by means of a reactor-sealing and solid-particle transfer means of any suitable type. The reactor-sealing and solid-particle transfer means illustrated comprises gas-tight valves 12 and 14 and intermediate pressuring chamber 13. The reactor-sealing and solid-particle transfer means operates in a cyclic manner as follows: With gas-tight valve 14 closed and gas-tight valve 12 open, catalyst flows from bin 11 into pressuring chamber 13 to fill the chamber to a predetermined level. Gas-tight valve 12 closes and chamber 13 and the contents thereof are purged with an inert and/or non-flammable gas such as flue gas. The purge gas is drawn from a source not shown through pipes 64 and 66 with valve 65 open and valve 63 closed. The purge is vented from chamber 13 through pipes 67 and 70 with valve 69 closed and valve 71 open. After the purge, valves 65 and 71 close and valve 63 opens and pressuring gas such as recycle gas under a pressure greater than that of the reactor flows into chamber 13, until the pressure therein is at least as great as, and preferably about 5 p. s. i. greater than, the pressure in reactor 17. Valve 63 closes and gas-tight valve 14 opens. The catalyst in chamber 13 flows into surge chamber 15. When pressuring chamber 13 is empty of catalyst gas-tight valve 14 closes and valve 69 opens and the residual gas in chamber 13 is vented until the pressure therein is approximately that of bin 11. Valve 69 closes and valve 65 opens and chamber 13 is purged with a suitable purge gas such as flue gas. The purge is vented as before through pipes 67 and 70. This completes the cycle.

The catalyst flows from surge chamber 15 through conduit 16 into reactor 17 as a substantially compact column of particle form catalyst and flows downwardly as a substantially compact column of particle form catalyst through reforming zones U and L of reactor 17 to and through dehydrating zone D of reactor 17.

Reforming zone U is that portion of reactor 17 between distributor 86 and a collector not shown at the top of the reactor. Reforming zone L is that portion of the reactor between distributor 86 and collector 89. Dehydrating zone D is that portion of the reactor between distributor 56 and collector 57.

The catalyst becomes deactivated by the deposition on the particles thereof of a carbonaceous contaminant known as coke. The deactivated catalyst flows from dehydrating zone D through catalyst flow control means 18 of any suitable type such as a throttle valve and into surge chamber 19. Since the regeneration of the catalyst generally takes place at a pressure lower than that of the reactor, it is necessary to remove the catalyst from surge chamber 19 by means of a reactor-sealing and solid-particle transfer means of a suitable type. The reactor-sealing and catalyst-transfer means illustrated is similar to that described hereinbefore and comprises gas-tight valves 20 and 22 and intermediate depressuring chamber 21. This reactor-sealing and solid-particle transfer means operates in a cyclic manner as follows: With gas-tight valves 20 and 22 closed pressuring gas such as recycle gas flows under pressure through pipes 53, 72 and 76 with valve 73 open and valves 75, 78 and 80 closed into depressuring chamber 21 until the pressure therein is approximately that of reactor 17. Valve 73 closes and gas-tight valve 20 opens. Catalyst flows from surge chamber 19 into depressuring chamber 21 until the latter is filled to a pre-determined level. Gas-tight valve 20 closes and valve 78 opens to reduce the pressure in chamber 21 to that of kiln or regenerator 31 by venting the gas through pipe 77 with valve 78 open and valve 80 closed. Gas-tight valve 78 closes and a purge gas, i. e., an inert and/or non-flammable gas such as flue gas, flows from a source not shown through pipe 74 and 76 with valve 73 closed and valve 75 open through chamber 21 and is vented through pipes 77 and 79 with valve 80 open. After purging, gas-tight valve 22 opens and the catalyst flows into surge bin 23. When chamber 21 is empty of catalyst, gas-tight valve 22 closes completing the cycle.

The catalyst flows from surge chamber 23 through conduit 24 to chute 25 and thence to a catalyst transfer means 26 of any suitable type such as a gas lift, and the like, an elevator, etc. The catalyst is transferred to chute 29 and flows along chute 29 to feed bin 30 of kiln or regenerator 31.

Kiln or regenerator 31 is of any suitable type in which the carbonaceous contaminant on the catalyst particles can be burned off in a stream of combustion-supporting gas such as air. The catalyst flows downwardly through kiln or regenerator 31 as a substantially compact column contacting as it does cooling coils 37 through which steam or other coolant brought from steam drum 39 through pipe 36 and returned to drum 39 through pipe 38 flows.

In its flow through kiln 31 the temperature of the catalyst is raised from about 600° to about 1400° F. and preferably from about 700° to about 1100° F. When it is desirable to preheat the catalyst after its use as a dehydrator of the wet recycle gas, a portion of the reactivated hot catalyst can be bled off through conduits 28 and 27 into catalyst transfer means 26 wherein the hot reactivated catalyst is mixed with the relatively cold catalyst being transferred from chute 25 to chute 29 by means of catalyst transfer means 26. The balance of the catalyst flows through conduit 32 to chute 33 and thence to catalyst transfer means 34 to chute 35 and reactor feed bin 11 ready to begin another cycle through reactor 17 and kiln 31.

Catalyst transfer means 34 can be of any suitable type such as a gas-lift and the like, an elevator, etc.

The hydrocarbon reactant can be a single hydrocarbon, a mixture of hydrocarbons capable of undergoing at least one of the reforming reactions resulting in the molecular changes known as isomerization, dehydrogenation, and dehydrocyclization. The hydrocarbon reactant is drawn from a source not shown through line 40, flows downwardly through absorber 41 in contact with recycle gas flowing from liquid-gas separator 105 through pipes 108 and 45. The stripped gas, i. e., recycle gas from which light hydrocarbons have been extracted by the hydrocarbon reactant, flows from absorber 41 through pipe 43 to refinery fuel system reservoir 44. The hydrocarbon reactant leaves absorber 41 through line 42, passes through heat exchanger 43 where it is in indirect heat exchange with effluent from reactor 17 and flows to furnace 44. In furnace 44 the hydrocarbon reactant is heated to a reforming temperature and leaves furnace 44 through line 45. The heated hydrocarbon reactant flows from line 45 where it is mixed with gas heat carrier or hydrogen containing recycle gas to line 47 under control of valve 46.

When it is desired to reform the hydrocarbon reactant in the presence of hydrogen-containing recycle gas, recycle gas drawn from liquid-gas separator 105 flows under pressure through pipes 108 and 46 under control of valve 47 through heat exchanger 48 into pipe 49. A portion or all of the recycle gas can be diverted from pipe 46 through pipes 53 and 54 under control of valve 55 to distributor 56. From distributor 56 the recycle gas flows upwardly counter-current to the downwardly flowing substantially compact column of particle-form catalyst and is dehydrated. The dried recycle gas flows through collector 57 to pipe 58 and thence either under control of valve 59 to line 47 directly or through pipe 60 under control of valve 61 to pipe 49 and thence to heater or furnace 50. The heated recycle gas flows from furnace 50 via pipe 51 under control of valve 52 to line 45 wherein it is mixed with heated hydrocarbon reactant to form a charge mixture.

Figure 3:
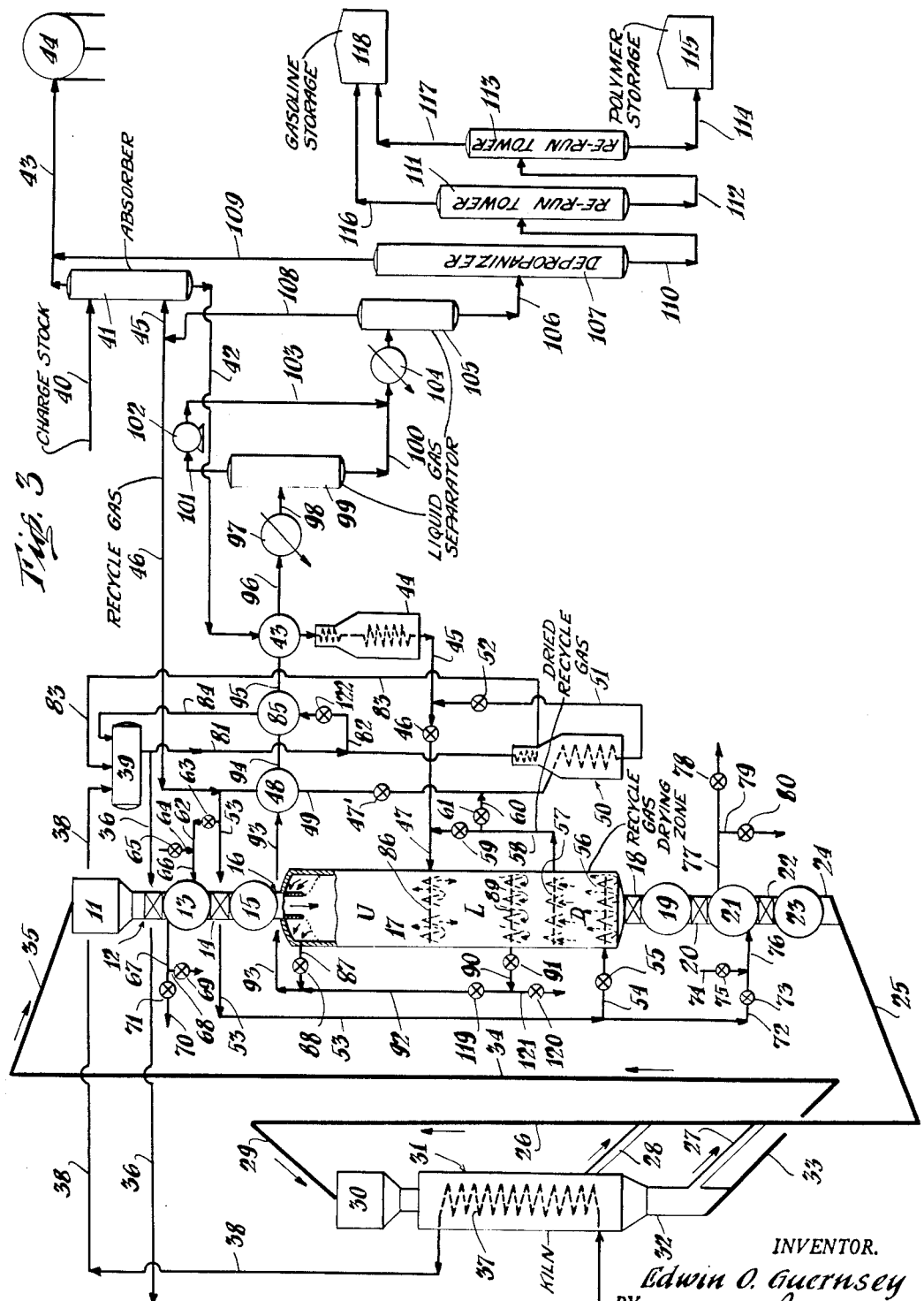

It will be observed that the flow sheet Figure 3 provides for several alternative distributions of the recycle gas. Thus, when the moisture content of the recycle gas is sufficiently low that only a portion need be dehydrated or dried a portion is passed through pipes 53 and 54 and the drying zone D. The quantity passed through drying zone D is sufficient that when mixed with the balance to make 1–15 mols, preferably 4–10 mols, recycle gas or 1–8 mols, preferably 2–5 mols, of hydrogen per mol of hydrocarbon reactant, the total recycle gas has a dew point not greater than 40° F. When the hydrocarbon reactant comprises a mixture of hydrocarbons, the average molecular weight thereof is determined in the usual manner from the A. S. T. M. distillation curve.

Whether the recycle gas which has passed through drying zone D shall pass through furnace 50 or be mixed directly with hydrocarbon reactant in line 47, is dependent upon several factors. The principal controlling factor is the required inlet temperature of the charge mixture, the temperature of the heated hydrocarbon reactant and the temperature of the dried recycle gas. For example, assume that sufficient catalyst flows through zone D per unit of time to dry all of the recycle gas required in zones U and L in that given interval to the required dew point. Then the controlling factors are charge mixture inlet temperature, and the temperature of the dried recycle gas effluent from zone D. If the dried recycle gas effluent from zone D, when mixed with the hydrocarbon reactant within the limits of the aforesaid ratio in line 47 will provide a charge mixture having a temperature within the limits of about 850° to about 1080° F., preferably about 960° to about 1060° F., all of the dried recycle gas effluent from zone D can be passed directly to line 47 under control of valve 59. On the other hand, if the temperature of the charge mixture in line 47 will be less than the aforesaid, a part or all of the dried recycle gas effluent from zone D will be passed through pipe 60 under control of valve 61 to pipe 49 thence through furnace 50 and pipe 51 to lines 45 and 47.

In the event that only a portion of the recycle gas required in zones U and L is dried in zone D, the balance will flow from pipe 49 through furnace 50 and pipes 51 and 45 under control of valves 52 and 46 wherein it will mix with the heated hydrocarbon reactant. The temperature to which the recycle gas will be heated in furnace 50 in this instance will be determined by (1) the temperature of the heated hydrocarbon reactant, (2) the volume and temperature of the recycle gas effluent from zone D, (3) the volume of recycle gas to be heated in furnace 50 and the charge mixture inlet temperature. Accordingly, all or a part of the recycle gas required to provide a ratio of about 1 to 15 mols, preferably 4 to 10 mols, of recycle gas per mol of heated hydrocarbon reactant or about 1 to about 8 mols, preferably about 2 to about 5 mols, of hydrogen per mol of hydrocarbon reactant can be passed through drier zone D and all or part of the effluent from zone D can be passed through furnace 50 together with or in the absence of recycle gas from pipe 49.

Accordingly, the heated charge mixture comprising about 1 to about 15 mols, preferably about 4 to about 10 mols, of recycle gas per mol of hydrocarbon reactant or about 1 to about 8 mols, preferably about 2 to about 5 mols, of hydrogen per mol of hydrocarbon reactant at a temperature of about 850° to about 1080° F., preferably about 960° to about 1060° F., in line 47, flows into distributor 86 and thence flows partly upwardly and partly downwardly counter-current and concurrent, respectively, to the downwardly flowing substantially compact column of particle-form catalyst.

The charge mixture vapors flowing upwardly through reforming zone U flows therefrom through line 87 under control of a suitable throttling means 88 such as a throttle valve. The charge mixture vapors flowing downwardly through reforming zone L flow therefrom through line 90 under control of throttling means 91 of any suitable type such as a throttle valve.

By proper correlated setting and pressure differential control known to those skilled in the art, throttling means 88 and 91 can be set to distribute the volume of charge mixture passing through zones U and L as required by the severity of the reforming conditions required. That is to say, valves 88 and 91 can be set and regulated to distribute 20 to 80 per cent, preferably about 35 to 60 per cent, of the charge mixture to zone U and the balance to zone L.

When the reformate from zone U and the reformate from zone L have substantially the same octane rating, it will usually be desirable to combine the effluents from both zones and to fractionate, etc., the combined effluent. However, whenever desirable or necessary, the effluent from each of zones U and L can be fractionated, etc. separately. Thus, the effluent from zone U flows through line 87 to line 92 and thence through line 93 to heat exchangers etc. When the effluent from zone L is to be combined with the effluent from zone U, valve 120 is closed and valve 119 opened and the effluent from zone L flows through lines 90 and 92 to line 93. When the effluent from zone L is to be treated separately, valve 119 is closed, valve 120 opened and effluent from zone L flows through lines 90 and 121 to fractionation, etc.

The combined effluent flows through line 93 to heat exchanger 48 where it is in indirect heat exchange with recycle gas flowing from separator 105. The effluent flows along line 94 to heat exchanger 85 where it is in heat exchange relation with steam drawn from drum 39 through pipes 81 and 82 under control of valve 122. From the heat exchanger 85, the effluent flows through line 95 to heat exchanger 43 where the effluent is in heat exchange relation with hydrocarbon reactant to be reformed. From heat exchanger 43, the effluent flows through pipe 96 to condenser 97. The condensed and uncondensed effluent flows from condenser 97 through line 98 to gas-liquid separator 99 wherein the condensed effluent is separated from the uncondensed effluent and is withdrawn through line 100. The uncondensed effluent flows through pipe 101 to compressor 102 where it is compressed to a pressure somewhat higher than the reactor pressure. The compressed uncondensed effluent flows from compressor 102 through pipe 103 to line 100 where it mixes with the condensed effluent and flows therewith through cooler 104 to gas-liquid separator 105.

In gas-liquid separator 105 the condensed effluent is separated from the uncondensed effluent. The gaseous or uncondensed effluent is the recycle gas and flows through pipe 108 to pipes 46 and 45 through which a portion of the recycle gas flows back to the reactor and the balance to absorber 41.

The condensed effluent flows from separator 105 through line 106 to depropanizer 107 from which the light ends are removed as overhead through pipe 109 to pipe 43 and the refinery fuel sphere 44.

The bottoms of depropanizer 107 flow through line 110 to primary re-run tower 111 where a gasoline of high octane number is taken as an overhead through line 116 to storage 118.

The bottoms of primary re-run tower flow therefrom through line 112 to secondary re-run tower 113 from which gasoline having a high octane rating is taken as an overhead through line 117 to storage 118 while the bottoms from secondary re-run tower 113 flow through line 114 to polymer storage 115.

Figure 4 is a schematic flow sheet of another means of applying the principles of the present invention to a reforming process. Since the primary differences between the flowsheet of Figure 3 and that of Figure 4 are in the disposition of the drying zone, a complete understanding will be obtained by those skilled in the art from a description of flow of catalyst, recycle gas and charge mixture through the reactor and external drying zones. In Figure 4 provision is made to combine the drying of the recycle gas with depressuring of the catalyst. However, the two operations can be carried out separately.

Reactor 217 is provided with a reactor feed bin and reactor-sealing and solid-particle transfer means similar to that of reactor 17. The particle-form catalytic material flows from the reactor-sealing and solid-particle transfer means into a surge chamber not shown and then as a substantially compact column through conduit 216 into reactor 217. The active catalyst flows downwardly as a substantially compact column of particle-form catalyst through reactor 217 counter-current to upwardly flowing vapors of heated charge mixture comprising hydrocarbon reactant and recycle gas in the ratio of about 1 to about 15 mols preferably about 4 to about 10 mols of recycle gas, or about 1 to about 8 mols preferably about 2 to about 5 mols of hydrogen per mol of hydrocarbon reactant introduced into the reactor from line 234 through distributor 286 and effluent removed therefrom through a collector not shown and line 235.

During passage through reactor 217, the catalyst becomes contaminated with a carbonaceous deposit which is removed by combustion in a stream of combustion supporting gas such as air in a suitable regenerator. The catalyst so deactivated flows from reactor 217 through catalyst flow control means 218 of any suitable type such as a throttle valve into parallel drying zones 223 and 224 through conduits 219 and 220, respectively, under control of valves 221 and 222, respectively.

When the chambers 223 and 224 are used solely as driers, the catalyst flows alternately through conduits 219 and 220 into chambers 223 and 224. The catalyst in chamber 223 is contacted with wet recycle gas, i. e., dew point above 40° F. flowing under pressure from a source not shown through pipes 236, 237 and 241 under control of valves 238 to chamber 223 and flowing from chamber 223 through pipes 242, 243 and 244 to pipe 254. When, for any reason, it is unnecessary to heat the dried recycle gas from chamber 223, the dry recycle gas, i. e., having a dew point below 40° F., flows from chamber 223 through pipes 242, 243, 244 and 250 with valves 245, 246, 247 and 249 closed and valves 252, 253 and 248 open to pipe 256, and thence under control of valve 251 to charge mixture line 234. On the other hand, when for any reason it is desirable or necessary to heat the dry recycle gas, the gas from chamber 223 flows through pipes 242, 243 and 244 with valves 252, 253 and 249 open and valves 245, 246, 247 and 248 closed to pipe 254, thence to furnace 255 and by way of pipe 256 under control of valve 251 to charge mixture line 234.

When the catalyst in chamber 223 has absorbed substantially all the water it can from the recycle gas, valves 238 and 252 are closed and valve 227 opens and the catalyst flows from chamber 223 through conduit 225 to conduit 229 and thence to a suitable reactor-sealing and solid particle-transfer means such as shown in Figure 3.

When wet recycle gas, i. e., recycle gas having a dew point above 40° F., flows from pipe 236 through pipe 257 under control of valve 258 into pipe 259 and thence through chamber 224. The dried recycle gas, i. e., recycle gas having a dew-point below 40° F., flows from chamber 224 through pipes 264, 243, 244 and 250 with valves 252, 245, 247 and 249 closed and valves 246, 253 and 248 open to pipe 250 and thence to pipe 256 when it is not necessary to heat the dried recycle gas. The dried recycle gas in pipe 256 flows under control of valve 251 into charge mixture line 234.

When it is necessary or desirable to heat the dried recycle gas in chamber 224, the dried recycle gas flows through pipes 264, 243 and 244 with valves 245, 252, 247 and 248 closed and valves 246, 253 and 249 open to pipe 254, thence to furnace 255 and by way of pipe 256 under control of valve 251 to charge mixture line 234.

When the catalyst in chamber 224 has adsorbed approximately all of the water it can from the recycle gas, valve 258 is closed and valve 228 is opened. The catalyst flows from chamber 224 through conduit 226 under control of valve 228 to conduit 229 and thence to a suitable reactor-sealing and solid particle-transfer means such as shown in Figure 3.

When the driers 223 and 224 are used as reactor-sealing and catalyst-transfer means as well as driers, the operation is in a cyclic manner as follows:

With gas-tight valves 221 and 227 closed, chamber 223 is pressurized with wet recycle gas to a pressure about equal to that in reactor 217. Gas-tight valve 221 opens and catalyst flows into chamber 223 to a predetermined level. Wet recycle gas flows through pipes 236, 237 and 241 under control of valve 238 through chamber 223 until the adsorptive capacity of the catalyst therein is approximately exhausted. Valve 238 then is closed and the gaseous contents of chamber 223 are drawn through pipes 242 and 262 under control of valves 252 and 245 by compressor 266 and discharged through pipe 263 into pipes 243 and 244 into pipe 254 or through pipe 250 into pipe 256 dependent upon whether or not it is necessary to heat the dry recycle gas. When the pressure in chamber 223 has been reduced from that of the reactor to that of the kiln, valves 245, 246, 248 and 249 are closed, and valves 235, 252, 253 and 247 are opened and an inert and/or non flammable purge gas drawn from a source not shown through pipe 240 under control of valve 235 is passed through chamber 223 and vented through pipes 242 and 243.

After chamber 223 is purged, valves 235 and 252 close and gas-tight valve 227 opens and the catalyst flows through conduit 225 to conduit 229 and thence to any suitable catalyst transfer means such as a gas lift and the like, an elevator etc. not shown by means of which the deactivated wet catalyst is transferred to a regenerator such as that shown in Figure 3 wherein the coke is burned off, the catalyst in a stream of combustion supporting gas such as air.

Meanwhile, with gas-tight valves 222 and 228 closed and the pressure in chamber 224 has been raised to at least about that of the reactor 217 by introducing wet recycle gas, i. e., recycle gas having a dew point higher than about 40° F., drawn from a source not shown through pipes 236, 257 and 259 with valve 258 open and valves 261 and 246 closed. When the pressure in chamber 224 is about that of reactor 217, gas-tight valve 222 is opened and catalyst flows into chamber 224 to a predetermined level. Gas-tight valve 222 closes and with valves 246, 253 and 248 or 249 open dependent upon whether the dry gas is to be heated the recycle gas flows through chamber 224 until the adsorptive capacity of catalyst therein for water is approximately exhausted. Valves 258 and 253 close and dry recycle gas is drawn from chamber 224 through pipes 264 and 262 under control of valves 245 and 246 by compressor 266 and discharged by compressor 266 through pipes 263, 243 and 244 into pipe 254 when it is necessary or desirable to heat the dry recycle gas in furnace 255 or through pipes 263, 243, 244 and 250 into pipe 256 when it is unnecessary to heat the dry recycle gas to higher temperatures than that at which it leaves chamber 224.

When the pressure in chamber 224 has been reduced to that of the kiln or regenerator, not shown, valves 245, 249 and 248 close and an inert and/or non-flammable purge gas such as flue gas drawn from a source, not shown, through pipe 260 under control of valve 261 is passed through chamber 224 and vented through pipes 264 and 243 with valves 252, 245, 248 and 249 closed and valves 246, 253 and 247 open. After chamber 224 is purged, gas-tight valve 228 opens and catalyst from chamber 224 flows through conduit 226 into conduit 229 and thence to any suitable catalyst transfer means, not shown, such as a gas-lift and the like, an elevator, etc. by means of which the deactivated catalyst is transferred to a kiln or regenerator of suitable type, not shown, wherein the coke can be burned off the catalyst in a stream of combustion-supporting gas such as air.

A hydrocarbon reactant such as a naphtha comprising hydrocarbons capable of undergoing at least one of the reforming molecular changes, isomerization, dehydrogenation and dehydrocyclization, drawn from a source not shown through line 230 under control of valve 233 is heated in furnace 231 to a reforming temperature but high enough that when mixed with heated recycle gas to form a charge mixture, the charge mixture will have a temperature of about 850° to about 1080° F. The heated hydrocarbon reactant flows through furnace 231 and line 232 into charge mixture line 234. Recycle gas, wholly or partly dried as described hereinbefore, flows from pipe 256 under control of valve 251 into charge mixture line 234 where the recycle gas is mixed with heated hydrocarbon reactant in the ratio of about 1 to about 15 mols, preferably about 4 to about 10 mols of recycle gas or about 1 to about 8 mols, preferably about 2 to about 5 mols of hydrogen per mol of hydrocarbon reactant to form a charge mixture having a temperature of about 850° to about 1080° F. and preferably about 960° to about 1060° F.

The charge mixture flows from line 234 into distributor 286 and from distributor 286 flows upwardly countercurrent to the downwardly flowing substantially compact column of particle-form catalyst. The effluent from reactor 217, i. e., recycle gas, make gas, unreformed hydrocarbon reactant and reformate flows from reactor 217 through a collector, not shown, to line 235 and thence to heat exchangers, condensers, fractionators, etc., and storage and/or distribution.

In Figure 5 is presented a diagrammatic flow sheet of a further application of the principles of the present invention. As described in co-pending application Serial No. 300,861 filed July 25, 1952, in the name of Sylvander C. Eastwood, a single reactor can be used to carry out a plurality of reactions under a plurality of reaction conditions of different severities employing the same particle-form catalyst. Thus, for example, a hydrocarbon reactant can be reformed under relatively mild conditions and the reformate subjected to a second reforming reaction in the presence of the same catalyst under more severe conditions. Further, a hydrocarbon reactant can be desulfurized under relatively mild conditions and then reformed under relatively severe conditions in the presence of the same catalyst. For subjecting a hydrocarbon reactant to a plurality of reaction conditions of different severities in the presence of the same catalyst and at the same time drying at least a portion of the gaseous heat carrier or recycle gas, the modus operandi is that shown diagrammatically in Figure 5.

Catalyst from a reactor feed bin is transferred by means of a reactor-sealing and catalyst transfer means (when the reactor pressure is appreciably greater than that of the feed bin) to a surge chamber and flows from the surge chamber as a substantially compact column through conduit 316 into reactor 317 having a zone U operating at one reaction severity level and a zone L operating at a reaction severity level lower than that of zone U. The catalyst flows downwardly through zone U as a substantially compact column of particle-form catalyst. After passing distributor 337, a portion of the catalyst flows downwardly as a substantially compact column of catalyst particles through by-pass 351 out of effective contact with hydrocarbon reactant. The balance of the catalyst from zone U flows downwardly as a substantially compact annular column of catalyst particles through zone L in contact with the hydrocarbon reactant.

The column of catalyst particles flowing downwardly through by-pass 351 while not in effective contact with hydrocarbon reactant is in contact with gas heat carrier or recycle gas which when it enters by-pass 351 through distributor 350, is wet, i. e., has a dew point greater than about 40° F.

The catalyst is deactivated in its passage through zones U and L and leaves reactor 317 as deactivated catalyst. The deactivated catalyst leaves reactor 317 through flow control means 318 of any suitable type such as a throttle valve and flows via conduits 324 and 325 to any suitable catalyst-transfer means such as an elevator, gas-lift, and the like, by means of which the deactivated catalyst is transferred to a regenerator or kiln such as 31 of Figure 3 wherein the carbonaceous contaminant is burned off in a stream of combustion-supporting gas such as air.

A hydrocarbon reactant, for example a straight run naphtha to be desulfurized and reformed in the presence of the same particle-form catalyst in two stages, is drawn from a source not shown through line 319, heated in furnace 320 to about 650° to about 850° F. and preferably about 700° to about 800° F. The heated hydrocarbon reactant leaves furnace 320, flows along lines 321 and 323 with valve 322 open and valves 336 and 334 closed and is distributed across the cross-section of annular desulfurizing zone L by means of a distributor 324 of any suitable type. The vapors of the hydrocarbon reactant flow upwardly counter-current to the downwardly flowing substantially-compact, substantially-annular column of particle-form catalyst in desulfurizing zone L at a catalyst-to-oil ratio of about 1 to about 4 and a space velocity of about 0.25 to 1.0, collector 338 and thence through lines 339, 341 and 342 with valves 343 and 344 closed and valve 340 open to reforming zone U. The at-least-partially-desulfurized reactant from zone L is distributed over the cross-section of zone U by distributor 337 of any suitable type.

When a dry gaseous heat carrier or a hydrogen-containing dry gas, i. e., a gas having a dew-point with respect to moisture not greater than 40° F., is to be employed in reforming zone U, all or a portion of such gas drawn from a source not shown through pipe 352 flows along pipe 349 under control of valve 348 to distributor 350 at the bottom of dryer 351 through which a substantially compact column of particle-form catalyst flows downwardly. The gas flows upwardly from distributor 350 counter-current to the downwardly flowing column of catalyst and is dehydrated to a dew point with respect to water not greater than about 40° F. The dried gas flows upwardly from drier 351 into zone U and mixes with the desulfurized hydrocarbon reactant introduced into zone U through distributor 337. The mixture of hydrocarbon reactant and dried gas flows upwardly counter-current to the downwardly flowing substantially compact column of particle-form catalyst in zone U and leaves zone U through a collector not shown and lines 345 and 347 under control of valve 346. Thereafter the effluent flows through heat exchangers, condensers, fractionators and the like, not shown.

In a similar manner, a hydrocarbon reactant can be subjected to reforming under different conditions of severity in the presence of the same particle-form catalyst whilst drying only a portion of the wet gas by external means, say refrigeration, to a dew-point greater than 40° F. and drying the balance to a dew-point below 40° F. in the internal dryer.

Thus, a hydrocarbon reactant is heated in furnace 320 to a temperature below a thermal reforming temperature. The heated hydrocarbon reactant flows through line 321 and a portion flows through line 335 under control of valve 336 and the balance through line 323 under control of valve 322. The reforming reaction is carried out in the presence of a gaseous heat carrier or a recycle gas comprising about 25 to about 80, preferably about 35 to about 60 per cent hydrogen and the balance $C_1$ to $C_6$ hydrocarbons. The gas is mixed with the hydrocarbon reactant in the ratio of about 1 to 15 mols, preferably about 4 to 10 mols, of recycle gas or about 1 to about 8 mols, preferably about 2 to about 5 mols, of hydrogen per mol of hydrocarbon reactant. When the hydrocarbon reactant is a mixture of hydrocarbons such as a naphtha the average molecular weight thereof is determined in the usual manner from the A. S. T. M. distillation curve. Since the less severe conditions are to exist in zone L the gaseous heat carrier or hydrogen containing gas drawn from a source not shown through pipe 352 in an amount sufficient to provide the aforesaid gas to hydrocarbon reactant ratio in zone L flows through pipe 326 under control of valve 327 to and through drier 328 and pipe 329 to furnace 330. In furnace 330, the gas is heated to a temperature such that when mixed with the hydrocarbon reactant in line 323 to form a charge mixture, the temperature of the mixture is about 925° to about 1100° and preferably about 950° to about 1075° F.

The charge mixture is distributed over the cross-section of annular zone L by means of distributor 324. The vapors of the heated charge mixture flow upwardly from distributor 324 counter-current to the downwardly flowing substantially compact substantially annular column of particle-form catalyst and are removed from zone L through collector 338 and line 339 with valves 340 and 344 closed and valve 343 open. The effluent from zone L flows through line 339 to heat exchangers, condensers, fractionators, and the like to storage and/or distribution.

A portion of the gas drawn through pipe 352 flows through pipe 349 under control of valve 348 to distributor 350 in drier 351, flows upwardly counter-current to the downwardly flowing substantially compact column of catalyst and is dried to a dew point not greater than about 40° F. The dried gas flows upwardly from drier 351 into reforming zone U where the dried gas mixes with hydrocarbon reactant heated in furnace 320 as aforesaid and flowing therefrom through line 335 under control of valve 336. When the temperature of the dried gas flowing from drier 351 is not high enough to provide when mixed with hydrocarbon reactant a suitable reaction temperature, the dried gas can be collected by a collector not shown, heated in a separate coil, not shown in furnace 330 and introduced into distributor 337.

The vapors of hydrocarbon reactant and gas dried in drier 351 flow upwardly counter-current to the downwardly flowing substantially compact column of catalyst in zone U and leave zone U through lines 345 and 347 under control of valve 346 to heat exchangers, condensers, fractionators and the like and to storage and/or distribution.

The conditions for desulfurization in zone L using a catalyst comprising 15 to 30, preferably 20, mol per cent chromia, balance alumina, are as follows:

|  | Broad | Preferred |
|---|---|---|
| Vapor Inlet Temperature, °F | 925 to 1,100 | 950 to 1,075 |
| Mols Hydrogen / Mols H/C Reactant | 1.5 to 10 | 2.5 to 7 |
| Space Velocity | 2 to 16 | 3 to 10 |

Typical reforming conditions are the following:

|  | Broad | Preferred |
|---|---|---|
| Reactor: | | |
| Vapor Inlet Temperature, °F | 850 to 1,080 | 960 to 1,060 |
| Catalyst Inlet Temperature, °F | 100 to 1,100 | 400 to 1,050 |
| Pressure, p. s. i. a | 15 to 600 | 100 to 300 |
| Mols Gas / Mols H/C Reactant | 1 to 15 | 4 to 10 |
| Mols Hydrogen / Mols H/C Reactant | 1 to 8 | 2 to 5 |
| Space Velocity | 0.1 to 6.0 | 0.5 to 2.0 |
| Kiln: | | |
| Temperature, °F | 600 to 1,400 | 700 to 1,100 |
| Pressure, p. s. i. a | 15 to 600 | 15 to 35 |

I claim:

1. In a hydrocarbon conversion process wherein a hydrocarbon reactant undergoes at least one of the molecular changes, hydrogenation, dehydrogenation, dehydroaromatization and isomerization in a reaction zone in the presence of a flowing substantially compact column of particle form solid contact mass material catalyzing said molecular change in the presence of a recycle gas and at an elevated temperature of at least 500° F. wherein the yield of desired hydrocarbon reaction product is adversely affected by the presence of more than about 12.6 grams of water per 1000 cubic feet of recycle gas, wherein said solid contact mass material is at least partially deactivated by the deposition of a carbonaceous deposit on said material, wherein said deactivated contact material is withdrawn hot from said reaction zone and wherein said hot withdrawn contact mass material is regenerated by combustion, the improvement which comprises contacting said hot withdrawn deactivated contact mass material with recycle gas containing more than 12.6 grams of water per 1000 cubic feet thereof in a drying zone and regulating the flow of hot withdrawn contact mass material and said recycle gas having more than 12.6 grams of water per 1000 cubic feet thereof through said drying zone to produce a recycle gas having not more than 12.6 grams of water per 1000 cubic feet.

2. In a hydrocarbon conversion process wherein a hydrocarbon reactant undergoes at least one of the molecular changes, hydrogenation, dehydrogenation, dehydroaromatization and isomerization in a reaction zone in the presence of a flowing substantially compact column of particle form solid contact mass material, catalyzing said molecular change in the presence of a recycle gas wherein the yield of desired hydrocarbon reaction product is adversely affected by a recycle gas having a dew point above 40° F., wherein said contact mass material is at least partially deactivated by the deposition of a carbonaceous deposit thereon, wherein said solid contact mass material is withdrawn hot from said reaction zone and regenerated by combustion of the carbonaceous deposit, the improvement which comprises contacting said hot withdrawn solid contact mass material before regeneration in a drying zone with recycle gas having a dew point above 40° F., regulating the flow of hot withdrawn catalyst and recycle gas through said drying zone to produce a recycle gas having a dew point not more than 40° F. and introducing said recycle gas having a dew point not more than 40° F. into said reaction zone.

3. A method of reforming a hydrocarbon reactant which comprises flowing a substantially compact column of particle form reforming catalyst through a reforming zone and a drying zone in series, the temperature of said catalyst entering said drying zone being at least 500° F. but not greater than a reaction zone temperature, flowing a hydrocarbon reactant through said reforming zone in the presence of a recycle gas having a dew point not greater than 40° F. to form an effluent containing reformate and gas, separating a wet gas having a dew point greater than 40° F. from said reformate, introducing said wet gas into said drying zone, contacting said wet gas with the aforesaid catalyst in said drying zone, regulating the flow of said catalyst and said wet gas through said drying zone to produce a dry recycle gas having a dew point not greater than about 40° F., and introducing said dry recycle gas into said reforming zone.

4. A method of reforming a hydrocarbon reactant which comprises flowing a substantially compact column of particle form reforming catalyst through a reforming zone, flowing a portion of said reforming catalyst through a second reforming zone as a substantially compact, substantially annular column of particle form reforming catalyst, flowing the balance of said reforming catalyst through a drying zone as a substantially compact column of particle form reforming catalyst, the temperature of said reforming catalyst entering said drying zone being at least 500° F. but not greater than the temperature of said reforming zone, contacting said reforming catalyst in said drying zone with a wet recycle gas having a dew point greater than about 40° F., regulating the contact of said catalyst and said wet recycle gas to obtain a dry recycle gas having a dew point not greater than about 40° F., and introducing said dry recycle gas into said reforming zone.

5. A method of reforming a hydrocarbon reactant which comprises flowing a substantially compact column of particle form reforming catalyst through a reforming zone into a drying zone, the temperature of said reforming catalyst entering said drying zone being at least 500° F. and not greater than the temperature of said reforming zone, contacting said substantially compact column of particle form reforming catalyst in said drying zone with at least a portion of wet recycle gas having a dew point not greater than about 40° F., regulating the contact of said catalyst and said wet recycle gas to obtain a dry recycle gas having a dew point not greater than about 40° F., and introducing said dry recycle gas into said reforming zone.

References Cited in the file of this patent

UNITED STATES PATENTS

| 2,388,536 | Gunness | Nov. 6, 1945 |
| 2,406,112 | Schulze | Aug. 20, 1946 |

OTHER REFERENCES

Payne et al.: "Petroleum Refiner," vol. 31, No. 5, May 1952, pages 117–123.

Payne et al.: "Thermofor Catalytic Reforming," "Petroleum Engineer," vol. 24, No. 6, pages C–10, 13–18, June 20, 1952.